A. O. BURGESS.
BRACELET.
APPLICATION FILED MAY 11, 1912.
1,055,315.
Patented Mar. 11, 1913.
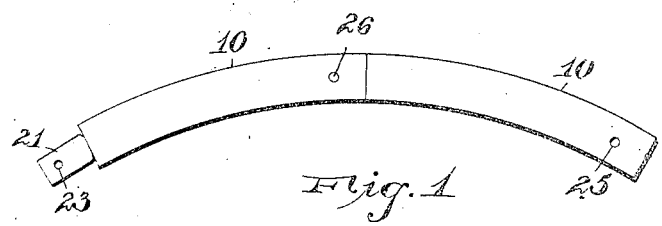
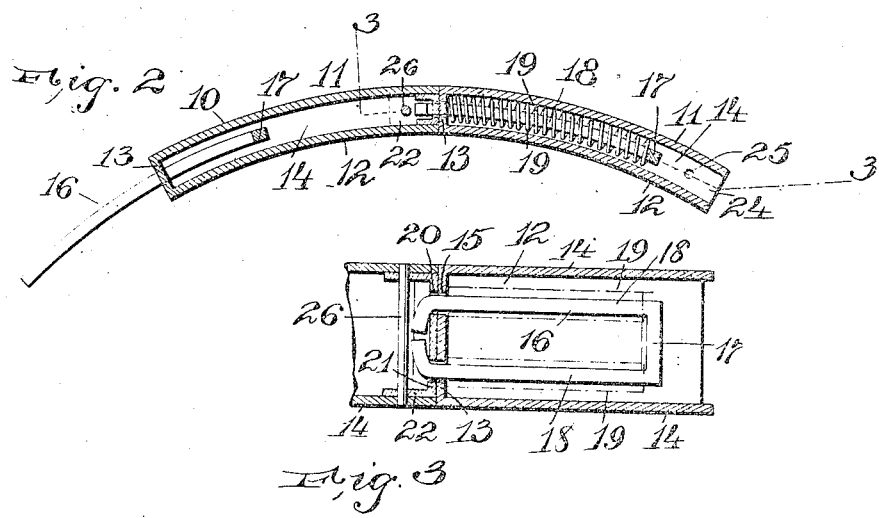
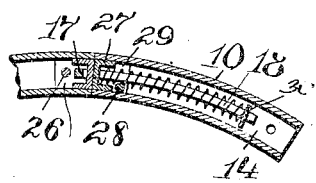
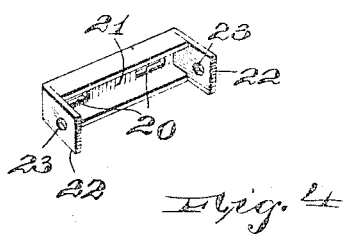
WITNESSES:
M. A. Johnson
W. E. Morton
INVENTOR
Andrew O. Burgess
BY
Wm H Canfield
ATTORNEY

UNITED STATES PATENT OFFICE.

ANDREW O. BURGESS, OF NEWARK, NEW JERSEY.

BRACELET.

1,055,315.  Specification of Letters Patent.  Patented Mar. 11, 1913.

Application filed May 11, 1912. Serial No. 696,637.

*To all whom it may concern:*

Be it known that I, ANDREW O. BURGESS, a subject of the King of Sweden, residing at Newark, in the county of Essex and State of New Jersey, have invented certain new and useful Improvements in Bracelets; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an expansible and flexible bracelet in which the links can be separated from each other circumferentially and also swung on each other to a limited extent both radially and transversely.

The invention consists of a series of box-like links that are connected by stirrups which extend into both of each adjoining pair of links, the stirrups permitting the links to which they are attached to swing on the stirrup in two directions, radially and transversely.

The invention also resides in certain means for connecting the stirrup to a clip which is fastened into one of the stirrups and thereby forms one of the end walls of the stirrup.

The invention is illustrated in the accompanying drawing, in which—

Figure 1 is a side view of a pair of links embodying my invention, and Fig. 2 is a longitudinal section showing one of the stirrups protruding from a link. Fig. 3 is a section on line 3, 3, in Fig. 2. Fig. 4 is a perspective view of a clip used in the chain. Fig. 5 is a section of a modified form of construction.

In the drawing, the bracelet, which is represented by two links, is composed of a series of box-like links 10 which are made of a top 11, bottom 12, one end piece 13, and the sides 14. The closed end 13 is provided with holes 15. A stirrup 16 having a cross-piece 17 and the parallel strands 18 is passed through the holes 15 in the end wall 13 after having been provided with springs 19, one over each strand. When the stirrup is pushed into the link 10 the springs 19 are made to abut on the cross-piece 17 and the end 13 of the link. The ends of the strands, which are straight when inserted, are then passed through the holes 20 in a clip 21. The clip has wings 22 on its ends, these wings being perforated as at 23. The ends of the strands 18 are bent over after they are passed through the holes 20 and are bent in a curved or inclined shape so that they do not fit tight against the inside of the wall of the clip 21. This permits the clip to swing transversely on the stirrup and also radially, as the holes 15 and 20 are made large so that the stirrup has considerable play. The clip is placed in the open end 24 of the next adjacent link, the side walls 14 having perforations 25 near the open end. When the clip is in place the holes 23 are alined with the holes 25 to permit the insertion of a pin 26 to hold the clip and link together. When the clip is in place its outside is flush with the end of the link and is pulled up tight against the closed end of the next adjacent link by the springs 19.

The bracelet herein described is easily assembled, is cheap to make and is composed of a very few parts.

A modified form of construction is shown in Fig. 5 in which a clip 27 is placed in the end of the link 10 instead of the link having a closed integral end 13. The clip 27 abuts on the clip 21 and is held in place by a pin 28 which passes through the sides 14 of the link and through the wings 29 of the clip. The cross-bar 30 is placed so as to connect the free ends of the stirrup, the cross-piece 17 being arranged in the clip 21.

The flexible and expansible bracelet herein shown and described is neat and compact, permitting the close contact of adjacent links and still permitting a transverse or sidewise swinging or flexing of the bracelet.

Having thus described my invention, what I claim is:—

1. An expansible bracelet comprising a series of box-like links, each having an open end and a closed end, the closed ends of one link abutting on the open end of the link next adjacent, a stirrup in each link and having its parallel strands extending through the closed end of the link, a clip secured to the open end of each link through which the strands of the stirrup pass and are secured against withdrawal, and a spring around each stirrup and abutting on the closed end of its link.

2. An expansible bracelet comprising a series of box-like links, each having an open end and a closed end, the closed ends of one link abutting on the open end of the link next adjacent, a stirrup in each link and having its parallel strands extending through the closed end of the link, a clip secured to the open end of each link through which the strands of the stirrup pass, the ends of the strands being turned toward each other and at an inclination to the longitudinal dimension of the link, and a spring around each stirrup and abutting on the closed end of its link.

3. An expansible bracelet comprising a series of box-like links, each having an open end and a closed end, the closed ends of one link abutting on the open end of the link next adjacent, a stirrup in each link and having its parallel strands extending through the closed end of the link, clips having wings on their ends and fitting in the open ends of the links, pins passing through the wings and the side walls of the links for securing them together, stirrups in the links, each stirrup passing through the closed end of it link and the clip of the next link, and working freely through these elements, the portion of the stirrup within the clip being turned so as to not fit tightly and bind, means for securing the clips in the open ends of the links, and springs in each link abutting on the stirrup therein and against the end wall of the link.

In testimony, that I claim the foregoing, I have hereunto set my hand this 10th day of May, 1912.

ANDREW O. BURGESS.

Witnesses:
P. J. COFFEY,
M. A. JOHNSON.